Fig. 2

July 1, 1941.   K. ZWICK   2,247,462
MILLING AND COPYING MACHINE
Filed March 22, 1938   5 Sheets-Sheet 3

Inventor

July 1, 1941.  K. ZWICK  2,247,462

MILLING AND COPYING MACHINE

Filed March 22, 1938   5 Sheets-Sheet 4

Inventor

July 1, 1941.   K. ZWICK   2,247,462
MILLING AND COPYING MACHINE
Filed March 22, 1938   5 Sheets-Sheet 5

Patented July 1, 1941

2,247,462

UNITED STATES PATENT OFFICE 2,247,462

MILLING AND COPYING MACHINE

Kurt Zwick, Munich, Germany, assignor to Friedrich Deckel, Munich-Prinz Ludwigshohe, Bavaria, Germany Application March 22, 1938, Serial No. 197,431
In Germany March 27, 1937

21 Claims. (Cl. 90—13.1)

This invention deals with milling and copying machines, some times called profile milling machines or profiling machines.

An object of the invention is the provision of an improved and more satisfactory machine of this character.

Another object is the provision of such a machine so designed that the rough milling or rough cutting part of the operation can be performed by the use of positive feeding means, while the final finishing operations can be performed by hand controlled feeding or direct hand pressure, thus permitting rapid accomplishment of the rough cutting operation without sacrifice of these fine details in the final article which can be attained only by guiding the mechanism by hand.

A still further object is the provision of a machine capable of operating in the above mentioned manner, which is adapted for making reproductions on an equal scale, on an enlarged scale, or on a reduced scale, according to the requirement of the work to be performed.

A further object is the provision of improved power feeding means for moving the work and the cutting tool relatively to each other, in order to make reproductions either on an equal scale, an enlarged scale, or a reduced scale.

A still further object is the provision of a machine so designed that heavy milling cutting may be undertaken without damage to the machine, and without sacrifice of lightness and ease of movement of the parts which are to be moved by hand during the final finishing operation.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

In some respects, the present machine is similar to the machine disclosed in my copending application for United States patent on Engraving and copying machine, Serial No. 71,483, filed March 28, 1936, especially the form shown in Figs. 7 to 14 of the drawings of said copending application, and various details of construction of the present machine, not specifically referred to herein, may be the same as or substantially the same as disclosed in said copending application.

The present machine comprises a suitable base 21 having an upstanding standard or frame 23 on which is supported a beam or member 25 mounted for movement of translation in all directions throughout a limited range, but held against movement of rotation, so that every position of this beam 25 is parallel to every other position thereof. This may be accomplished by any suitable form of mounting, such, for example, as the mounting and guiding means disclosed in said copending application in connection with the corresponding parallel motion beam or member 125 thereof.

Mounted substantially at the top of the frame 23 and extending forwardly above the beam 25 is a pantograph linkage of the lazytongs type, indicated in general at 27, the details of construction of which may be, for example, the same as those of the corresponding pantograph linkage made up of the parts 146 to 149, inclusive, in my said copending application. The main pivot 29 of the present linkage corresponds to the main pivot 144 of the linkage in said copending application, and may be mounted on a horizontal pivot like the pivot 142 of said copending application, which horizontal pivot may be mounted on a carrier 31 corresponding to the carrier 141 of said copending application and similarly adjustable back and forth along a guideway 33 on the frame 23, corresponding to the guideway 140 on the frame 101 of said copending application.

The point 35 of the present pantograph linkage is pivotally connected to the parallel motion beam 25, with the same features of adjustment as disclosed in said copending application with regard to the connection of the pantograph point 156 thereof to the beam 125 thereof. The end 37 of the present pantograph linkage is formed as a socket adapted to receive a rod to form a handle for manual movement of the pantograph linkage when desired, or a tracing stylus or a cutting tool assembly may be mounted at this point 37 of the present pantograph, in the same manner disclosed in said copending application, and the holder of such tracing stylus or cutting tool assembly may be guided for vertical movement by a pivoted linkage mounted on the parallel motion beam 25 and corresponding to the pivoted linkage 131, 134 of said copending application.

As usual, the pantograph linkage may be adjusted to give various ratios of reduction or enlargement, care being taken to adjust the parts so that the points 29, 35, and 37 lie always in the same vertical plane. When motion is imparted to the point 37, in any direction (with either horizontal or vertical components, or both) motion in the same direction will be transmitted to the beam 25, on a reduced scale or ratio depending on the setting of the pantograph linkage.

On the parallel motion beam 25 is mounted an angular bracket 41 adjustable lengthwise along the front face of the beam 25 and capable of being clamped in any desired position along its range of adjustment by the clamping bolts 43. A holder 45 is mounted on this angular bracket 41 and is adjustable horizontally along this bracket in a direction closer to or farther away from the front face of the beam 25, clamping bolts being provided to maintain this holder in any desired adjusted position. The holder 45 is adapted to receive either a tracing stylus or a rotary cutting tool, as desired, a tracing stylus being illustrated at 47.

Also mounted on the beam 25 is another holder 49. This holder may likewise be mounted for adjustment on the beam, but it is usually not necessary that it be adjustable, and for the sake of economy it may be mounted in fixed position on the front face of the beam. The holder 49 is likewise adapted to receive, as desired, either a tracing stylus or a rotary cutting tool, the chuck of a cutting tool being indicated at 51. The chuck is at the lower end of a spindle assembly which extends upwardly through the holder 49, and preferably the elevation of the chuck 51 (and of the cutting tool or tracing stylus held thereby) may be adjusted by suitable adjusting means, such as the screw 53. When a rotary cutting tool is mounted in the chuck 51, the spindle assembly within the holder 49 is driven by suitable means such as an electric motor 55 mounted on the frame 23 and driving a belt extending from a pulley on the motor shaft to a pulley on the stub shaft 57 supported adjustably from the belt housing 59 which is mounted for swinging movement about the axis of the motor shaft, these parts corresponding in general to the stub shaft 248 and belt housing 244 of said copending application. Another belt runs from another pulley on the same shaft 57, through the housing 61, to a pulley on the upper end of the spindle assembly and the holder 49, the housing 61 being supported near one end from the shaft 57 which in turn is supported from the housing 59. The other end of the housing 61 is pivotally connected to the upper end of the holder 49 in a manner similar to the connection of the housing 252 with the holder 127 in said copending application, so that the driving belts are maintained under proper tension at all times notwithstanding movement of the housing 49 in any direction relatively to the driving motor 55.

In order to permit the machine to accomplish heavy milling work without sacrifice of the flexibility and lightness required for hand finishing of fine work, there is a forward extension 65 on the upper part of the frame 23, beyond the left end of the beam 25, and on the front face of this extension 65 is mounted a hollow angular bracket 67 clamped to the extension 65 by the bolts 69 which, when loosened, permit the entire bracket 67 to be turned on the face of the extension 65 about the axis of oscillation indicated diagrammatically at 71 (Fig. 2) so that the bracket may be clamped in any desired angular position. Mounted on this bracket 67, which is of heavy and rigid construction, is a heavy duty holder 73 mounted on a face of the bracket which is substantially in a vertical plane perpendicular to the front face of the extension 65. The holder 73 is adjustably held on the bracket 67 by the clamping bolts 75 and when these are loosened the holder may be turned relatively to the bracket about the axis of oscillation indicated diagrammatically at 77 (Fig. 1) and clamped again in its new position of adjustment. By utilizing this possibility of turning the holder 73 relatively to the bracket 67 about the axis 77, and turning the bracket 67 relatively to the extension 65 about the axis 71, the holder 73 may be brought to any desired angular inclination relatively to the extension 65 of the frame 23.

In the holder is mounted a spindle assembly 81, the lower end of which removably receives a cutting tool or milling cutter 83. The spindle assembly 81 is preferably driven from the same motor 55 above mentioned, by driving connections to be described below.

The frame extension 65 is provided also with a horizontal slide 91 movable by a hand wheel 93, and on this slide 91 is a second horizontal slide 95 at substantially right angles thereto movable by the hand wheel 97. This slide 95 is connected by a releasable connection 99 with the holder 49 on the beam 25, so that by operating the hand wheels 93 and 97 the beam 25, and any cutting tools mounted on it or controlled by movement of it, may be moved by positive feeding means rather than by direct manual pressure. The slides 91 and 95 may also be driven by power driving means from the motor 55, as described below, rather than by manual operation of the hand wheels 93 and 97, but the term "positive feed" as herein used is intended to include this mechanical feeding means broadly, whether the driving be effected by manual actuation of the hand wheels 93 and 97, or whether it be effected from the motor 55.

Suitable work table and pattern table means are provided for holding the work to be operated upon and the pattern to be followed. According to the present invention these means may comprise a slide 101 vertically movable on the frame 23 by means of a screw 103 which can be rotated by a hand wheel 105, the slide 101 carrying a horizontal slide 107 moved by a screw 109 which can be rotated by a hand crank 111. The slide 107 in turn carries another horizontal slide 113 movable in a direction at right angles to the movement of the slide 107 by means of a screw 115 which can be turned by a hand crank 117.

The upper surface of the slide 113 forms a table which may for convenience be called a work table, though under certain conditions it may be used for supporting the pattern or model rather than the work. The top of the table is provided with the usual undercut or T-shaped grooves to cooperate with the usual T-headed bolts for clamping the work or the pattern to the table.

There is also provided other table means including a vertical slide 101b movable on the frame 23 by means of a screw 103b which may be rotated by a hand wheel 105b. The slide 101b carries a horizontal slide 107b movable by means of a screw 109b which can be turned by a hand crank 111b, and this slide 107b carries another horizontal slide 113b movable in a direction at right angles to the movement of the slide 107b by means of a screw 115b which can be turned by a hand crank 117b. The upper surface of the slide 113b forms a table which may for convenience be termed the pattern table, although under certain conditions it is used for supporting the work rather than the pattern. This table, like the work table 113 is provided with the usual clamping grooves.

Figure 1:
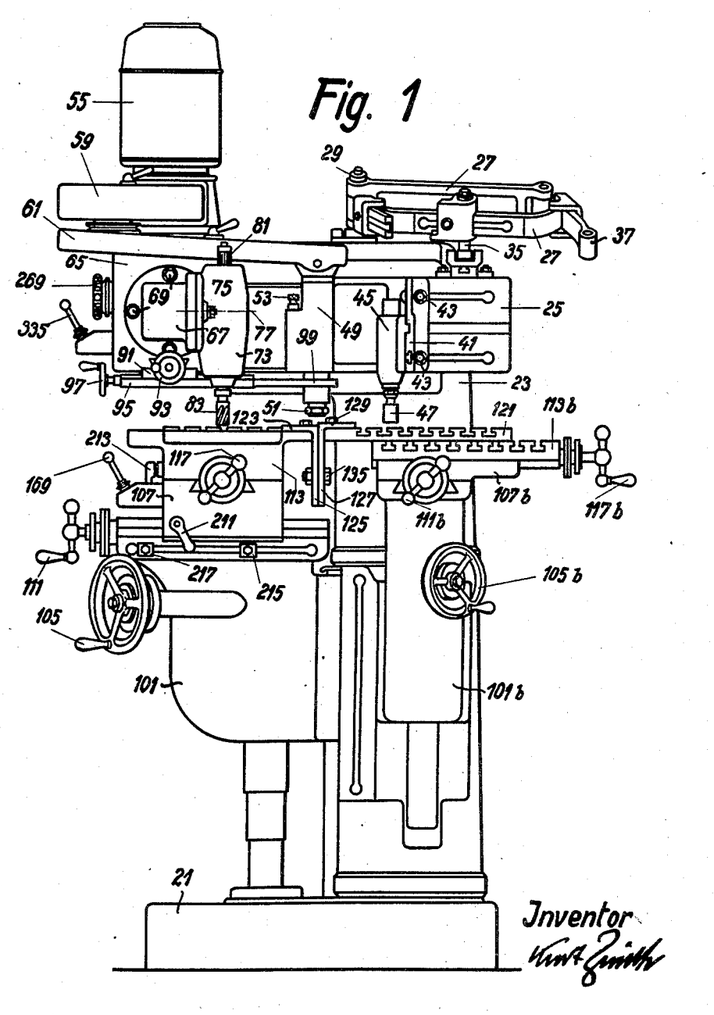
Fig. 1 is a front elevation of a machine constructed in accordance with a preferred embodiment of the invention.
Figure 2:
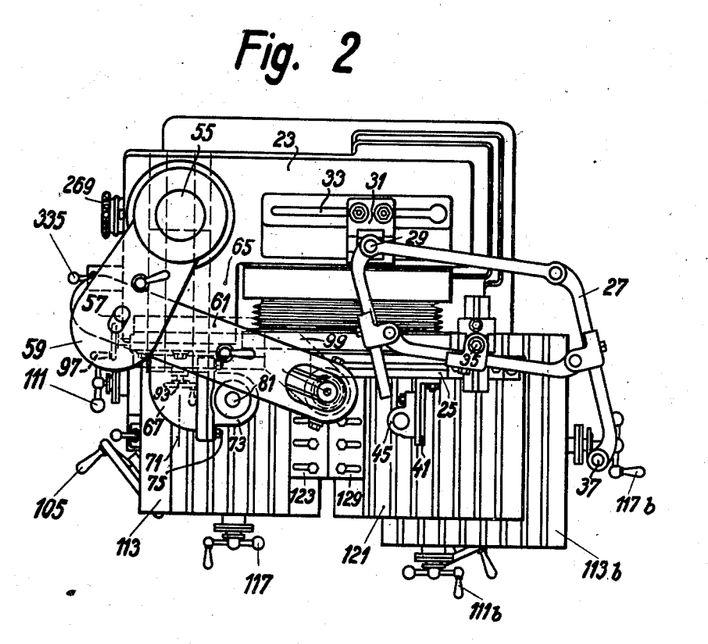
Fig. 2 is a plan thereof.
Figures 5, 12:
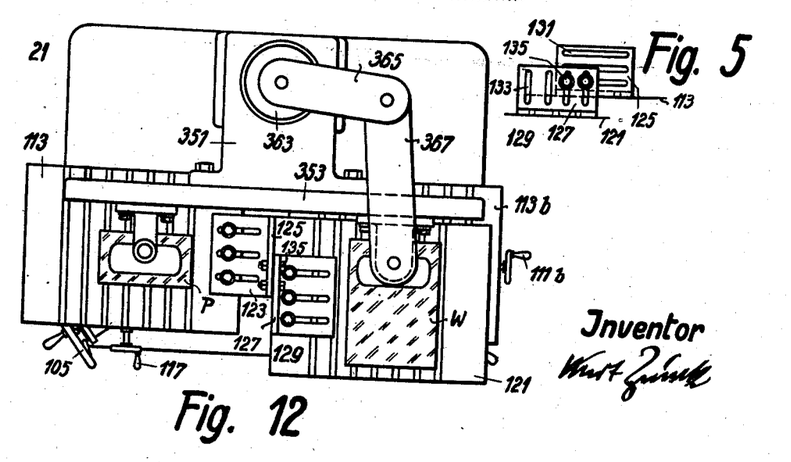
Fig. 5 is an elevation of one form of connection between the work table and the pattern table.
Fig. 12 is a plan view thereof.

Power means may be provided, as described below, for moving the tables 113 and 113b in any direction, either at the same speed or at any desired speed ratio to each other. When such power means are not being used however, and when the tables are fed manually, then for equal scale reproductions the present invention provides a supplementary table 121 movably mounted on and supported by the table 113b and connected to the table 113 to move therewith. To form such connection between the tables, an angle bracket is provided having a horizontal flange 123 capable of being bolted to the table 113 in various positions, and having also an approximately vertical flange 125 which lies against a similar approximately vertical flange 127 of another angle bracket having a horizontal flange 129 which can be bolted or otherwise secured to the supplementary table 121 in various positions thereon. The vertical flanges 125 and 127 of these two brackets may extend either downwardly from the tables 113 and 121, as shown in Fig. 1, or upwardly from these tables as shown in Fig. 5. In either event, one of the vertical flanges (such as 125) preferably has horizontal slots 131, and the other of these flanges preferably has vertical slots 133, so that when the clamping bolts 135 which extend through these slots are loosened, the brackets may be moved either horizontally or vertically with respect to each other, thus enabling the supplementary table 121 to be adjusted to any desired position relatively to the main table 113 to which the supplementary table is connected. This possibility of adjustment of the supplementary table is important, for it permits the position of the pattern and the work to be adjusted in any necessary manner relatively to each other, after the pattern and work have been firmly clamped to their respective tables, without the necessity of unclamping them therefrom. It is seen that one table may be raised or lowered relatively to the other by permitting the clamping bolts 135 to slide up or down the slots 135, and may be moved horizontally relatively to the other in one direction, by permitting the bolts 135 to slide along the slots 131, and may be moved horizontally in another direction at right angles to the meeting faces of the flanges 125 and 127 by loosening the clamping bolts which hold horizontal flanges 123 and 129 to their respective tables, these bolts preferably passing through slots in the horizontal flanges which extend in a direction approximately perpendicular to the plane of the vertical flanges 125 and 127.

For some kinds of work, it is desirable that the table 113 and the supplementary table 121 be freely movable vertically with respect to each other but nevertheless be rigidly coupled in a horizontal direction. When this is desired the coupling arrangement shown in Fig. 6 may be employed. Here, a bracket 137, somewhat U-shaped in horizontal section, is clamped to the table 113 by clamping bolts 139 which are mounted in a horizontal groove in the edge of the table 113 so that by loosening these bolts, the bracket 137 may be moved horizontally along the edge of the table. Vertical guiding grooves in the side legs of the bracket 137 receive the side edges of a plate 141 secured by screws or the like to the supplementary table 121. The plate 141 may slide freely vertically in the guiding grooves in the bracket 137, but can not move horizontally in any direction.

Figures 6, 7, 11:
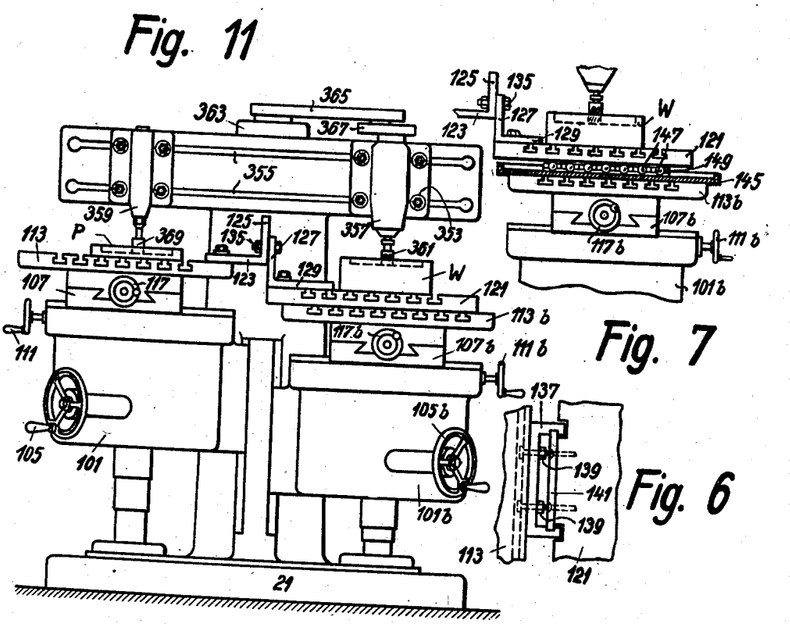
Fig. 6 is a plan of another form of such connection.
Fig. 7 is a front elevation of one of the tables illustrating its mounting on a supporting table.
Fig. 11 is a front view of another form of machine according to the present invention.

In many cases, the supplementary table 121 may rest directly on the top of the pattern table 113b and simply slide thereon. When the articles to be supported by the table 121 are especially heavy, or when for other reasons the minimizing of friction is desired, then an antifriction bearing may be inserted between the tables 121 and 113b, as shown in Fig. 7. Here, a plate 145 with a smooth upper surface is placed on the table 113b, and the table 121 rests on balls 147 interposed between the top of the plate 145 and the smooth top of the table 121, the balls being kept in proper spaced relation to each other by a spacing member 149 having holes in which the balls are loosely placed.

Figure 3:
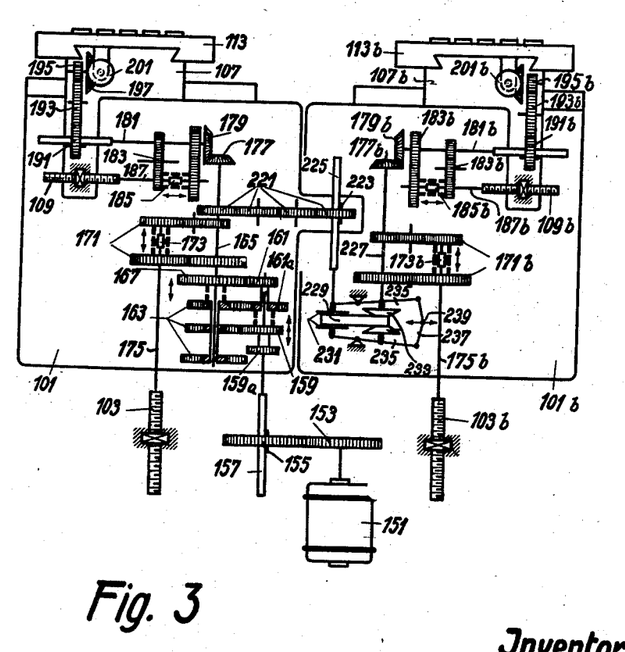
Fig. 3 is a diagrammatic front elevation of one of the power feeding arrangements.
Figure 4:
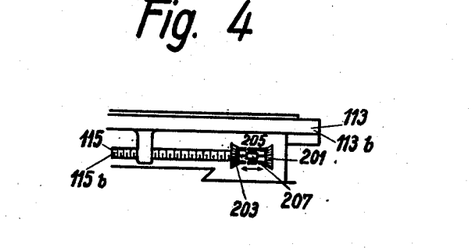
Fig. 4 is a diagrammatic side elevation of part of the feeding arrangements shown in Fig. 3.

The above mentioned power feeding means for the tables may be constructed in the manner shown diagrammatically in Figs. 3 and 4. A source of power 151, such as an electric motor, is mounted on the fixed frame 21, 23 and drives a gear 153 meshing with another gear 155 slidable longitudinally on but non-rotatably connected (as by means of a spline or the like) to a shaft 157 on the vertical slide 101. This shaft 157 carries and drives gears 159 and 159a connected to each other and slidable longitudinally along the shaft, and also carries a sleeve rotatable on the shaft, on which sleeve gears 161 and 161a are rigidly mounted. The various gears cooperate with gears 163 on a sleeve rotatable on a shaft 165 also mounted on the side 101, and a gear 167 is slidable longitudinally on but non-rotatably connected to the shaft 165. In one position, the gear 167 meshes with the gear 161, and when it is moved along the shaft 165 from this position it is unmeshed from the gear 161 but clutched to the sleeve carrying the gears 163. The sleeve carrying the gears 159 and 159a may be moved to three positions, in one of which the sleeve is clutched to the gear 161a and the gears 159 and 159a are unmeshed from the gear 163. In another position of this sleeve the gear 159 meshes with one of the gears 163, but the gear 159a is unmeshed and the sleeve is unclutched from the gear 161a. In another position the gear 159a meshes with another of the gears 163 but the sleeve carrying these gears is again unmeshed from the gear 161a. By meshing the gears and operating the clutches in various combinations by means of a control handle not shown the shaft 165 can be driven with six different speeds from the motor 151.

This shaft 165, through a set of reversing gears 171 and clutch 173, drives a shaft 175 connected to the screw 103 which raises and lowers the table support 101. The clutch 173 can be engaged with the reversing gear mechanism to rotate the shaft 175 in either direction, or may be disengaged so that the shaft 175 is not driven at all.

The shaft 165 carries a bevel gear 177 meshing with another bevel gear 179 on a shaft 181 which, through a reversing gear 183 of known construction and clutch 185, drives another shaft 187 connected to the screw 109 which moves the slide 107 on the support 101. The clutch 185 may be engaged in either of two positions, to drive the screw 109 in either direction, or may be disengaged so that no driving results.

The shaft 181 carries a gear 191 longitudinally slidable on the shaft but non-rotatably connected therewith, as by means of a spline or the like. This gear is held by suitable mechanism on the slide 107 to travel therewith, and through an intermediate gear 193 it drives another gear 195 connected to a bevel gear 197 which meshes with two other bevel gears 201 and 203 (Fig. 4) loosely rotatable on the shaft 205 mounted on the slide 107 and connected to the screw 115 which drives the slide 113. A clutch 207 may be shifted to produce a driving relationship between the screw shaft 205 and either of the bevel gears 201 and 203, or may be put in a neutral position where no driving results.

Thus the support 101, the slide 107, and the slide or table 113 will all be driven in any desired direction from the source of power 151, depending on the manner in which the clutches 173, 185, and 207 are engaged or disengaged. Such clutches may be controlled by a control handle 169 (Fig. 1) working simultaneously with suitable particular clutch shifter arms accessible on the exterior of the machine, such, for example, as the arm 211 (Fig. 1) controlling the clutch 185 which moves the slide 107, and the shifter arm 213 for controlling the clutch 207 which moves the slide 113. These shifter arms are mounted on the slides which they control, to travel therewith, so that they may be automatically operated by adjustable stops if desired, although of course, the clutches may be shifted by the handle 169. For instance, the shifter arm 211 may operate between two adjustable stops 215 and 217 (Fig. 1) on the support 101. Assuming that the power drive is operating, the slide 107 will be driven in one direction until the arm 211, mounted on and traveling with this slide, comes into contact with the stop 215, which stop will shift the arm to engage the clutch in the reverse manner and cause driving of the slide in a reverse direction. Then when the slide 107 moves in the reverse direction until the arm 211 comes into contact with the other adjustable stop 217, this stop will again reverse the clutch and cause the slide 107 to be driven once more in its original direction. Thus the slide 107 will continue to move back and forth, through a range of movement determined by the setting of the stops 215 and 217, this movement being automatic and requiring no attention on the part of the operator. Similarly adjustable stops control the shifter arm 213 of the clutch which operates the slide 113, and similar stops control the shifter arm (not shown) of the clutch 173 which controls the vertical movements of the support 101.

The other support 101b and its slides 107b and 113b may be driven in a similar manner from the same motor 151. Referring again to Fig. 3, the shaft 165, through gearing indicated in general at 221, drives a gear 223 longitudinally slidable on a shaft 225 mounted in the support 101b, but non-rotatably connected to such shaft as by means of a spline or the like. The shaft 225 is connected to another shaft 227 also mounted in the support 101b, by means of a variable speed drive of known form, capable of fine adjustment to any desired speed ratio within its range. For instance, the connection may be by means of a belt 229 running over conical pulleys 231 slidably mounted on the shaft 225 and other conical pulleys 233 slidably mounted on the shaft 227. The pulleys are controlled by arms 235 each connected to one of the pulleys 231 and one of the pulleys 233 and fulcrumed between the two pulleys. The arms 235, in turn, are controlled by a toggle arrangement 237, the mid point 239 of which may be moved in either direction as shown by the arrows, to straighten the toggle to move the connected ends of the arms 235 as far apart as possible, or to collapse the toggle thus moving the connected ends of the arms 235 toward each other. The movements of the arms 235 simultaneously spread the pulleys 231 and move the pulleys 233 toward each other, or vice versa, thus varying the effective diameter of the portions of the pulleys which cooperate with the belt 229, and thus changing the driving ratio in a stepless manner or finely adjustable manner as desired.

From the shaft 227, the screws 103b, 109b, and 115b are driven in the same manner in which the screws 103, 109, and 115 are driven from the shaft 165. The driving gearing between the shaft 227 and the screws driven thereby is designated in Fig. 3 by the same reference numerals used for the gearing between the shaft 165 and its screws driven thereby, with the addition of the letter "b" to each numeral.

Figures 8, 10:
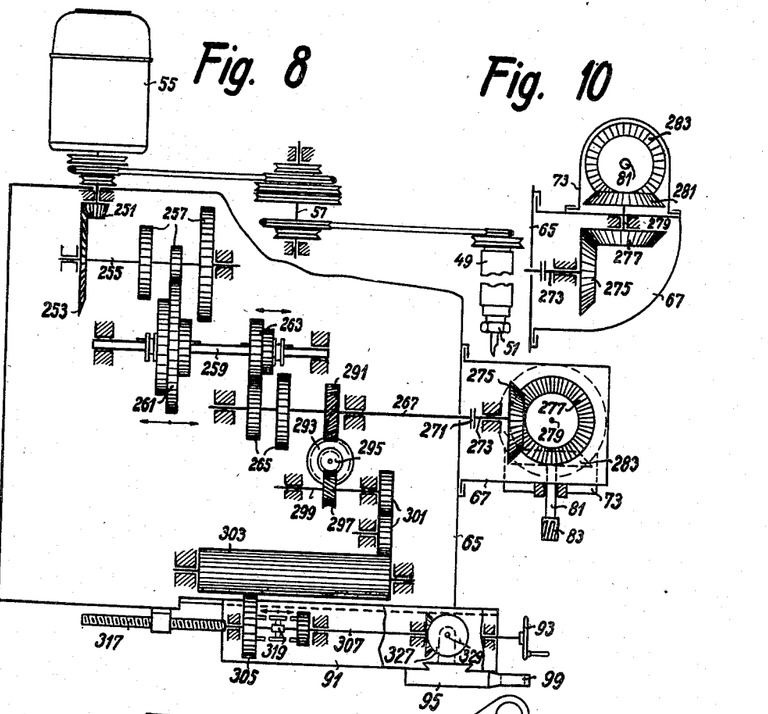
Fig. 8 is a diagrammatic vertical section illustrating the drive of the spindles and certain feeding means from the motor.
Fig. 10 is a diagrammatic horizontal section illustrating part of the drive of the heavy cutting spindle.
Figure 9:
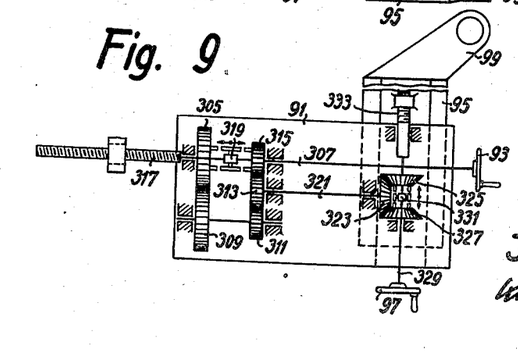
Fig. 9 is a diagrammatic horizontal section illustrating further features of said drive.

The drive for driving the supplementary cutter 83 and for feeding the slides 91 and 95 from the same motor 55 which drives the tool spindle 51, will now be described with special reference to Figs. 8, 9, and 10. The motor 55, through a bevel gear 251 drives a bevel gear 253 on a shaft 255 to which gears 257 of different diameters are fixed. On a parallel shaft 259 is slidable a group of gears 261 engageable with the gears 257 in known manner to drive the shaft 259 at various speeds. On this shaft 259 is also slidable another group of gears 263 engageable with one or another of the gears 265 on the shaft 267 which extends through the forward extension 65 of the machine frame. The gears 261 and 263 are controlled by the control knob 269 (Fig. 1) so that they may be meshed and unmeshed in various combinations in order to drive the shaft 267 at various desired speeds.

The shaft 267 is in line with the opening in the front face of the extension 65 over which the bracket 67 is placed. The front end of the shaft 267 terminates in a disengageable driving connection 271 which may be engaged with or disengaged from a complementary part on the rear end of a shaft 273 mounted in the bracket 67. This shaft drives a bevel gear 275 meshing with another bevel gear 277 on a shaft 279 mounted in the bracket 67 and driving a bevel gear 281 which meshes with another bevel gear 283 on the spindle 81 which carries the cutter 83.

By reason of the bevel gears above mentioned, there is no interference with turning the spindle holder 79 on its bracket 67 as above explained, or turning the bracket 67 on the front of the frame 65. The turning axes 71 and 77 (Figs. 1 and 2) previously mentioned, correspond with the axes of the shafts 267 and 279, respectively. When the bracket 67 is removed from the frame 65, the driving connection 271 readily comes apart, and a cover plate may be placed over the opening in the front of the frame 65, in closing the end of the shaft 267 to avoid accidental engagement therewith.

The power feeding means for the slides 91 and 95 is also driven from the shaft 267. The shaft carries a spiral gear 291 driving another spiral gear 293 on a shaft at right angles to the shaft 267, within the frame 65. This second gear 293 is connected to a worm 295 which drives a worm wheel 297 on a shaft 299 which shaft, through the gears 301, drives a cylindrical gear 303 having a wide face, with a length slightly greater than the range of travel of the slide 91, the axis of the cylindrical gear 303 being parallel to the direction of movement of the slide. Thus, in all positions of the slide, a gear 305 mounted thereon is in proper meshing relation to the gear 303. This gear 305 is rotatable on a shaft 307 in the slide, and the gear 305 drives another gear 309 connected to a gear 311 which drives an intermediate gear 313, and through it, another gear 315 rotatable on the above mentioned shaft 307. The shaft 307 carries the hand wheel 93 and also is connected to the feeding screw 317 mounted on the slide 91, which engages a nut on the frame 65 so that rotation of the screw drives the slide in one direction or the other. A clutch 319 is shiftable to connect the shaft 307 to either of the gears 305 and 315, which are driven in opposite directions through the gearing above mentioned.

The gear 313, which is thus constantly driven irrespective of the clutching or unclutching of the clutch 319 drives a shaft 321 on the slide 91, which shaft carries a bevel gear 323 meshing with two bevel gears 325 and 327 rotatably mounted on the shaft 329, thus driving these bevel gears in opposite directions. A clutch 331 clutches the 329, to either of the bevel gears 325 and 327, thus driving the shaft 329 in either direction as desired. This shaft 329 carries the hand wheel 97 for manually controlling the slide 95, and also is connected to the feeding screw 333, mounted on the slide 91 and passing through a nut on the slide 95 so that rotation of the screw feeds the slide 95 relatively to the slide 91.

The handle 335 (Figs. 1 and 2) controls the position of both clutches 319 and 331, and may be moved to various positions to clutch either or both clutches in any desired direction.

The machine thus far described may be operated in several different ways. If, for example, it is required to do profile milling or die sinking which necessitates heavy cutting in the rough cutting operation, the supplementary cutter holder 73 may be placed on the machine and the work piece may be clamped on the table 113 in position to be operated upon by the cutter 83. If the reproduction is to be made on an equal scale rather than on an enlarged or reduced scale, then the supplementary table 121 is used and the pattern or model is clamped to this supplementary table. The parallel motion beam 25 is then moved all the way to the right of its range of movement (when viewed as in Fig. 1) and the holder 45 is moved leftwardly along the beam to a point near the center of the beam, as shown for example in Figs. 1 and 2. The beam is held in fixed or immovable position by means of the connection 99 between the holder 49 and the slides 91 and 95.

The tracing stylus 47 mounted in the holder 45 is brought into cooperative relation with the pattern on the supplementary table 121. In order to adjust the pattern and the tracing stylus to exactly the proper position with respect to each other, for any given position of the cutter 83 on the work, the bracket 127, 129 may be shifted with respect to the bracket 123, 125 by loosening the clamping bolts 135, and either or both of the brackets may be shifted with respect to its associated table 121 or 113, as already explained. Thus the pattern and the tracing stylus may be brought exactly to the desired position with respect to each other, without the necessity of moving the tracing stylus holder 45 with respect to the beam 25.

When the parts have thus been set in proper position, the table 113 is moved as required, to shift the work relatively to the rotating milling cutter 83. Such movement of the table 113 may be accomplished by hand, by manual actuation of the hand wheels or cranks 111 and 117, or may be accomplished by the power of the motor 151, through the gearing shown in Fig. 3. In either event, the movements of the table are accomplished by what may be termed positive feeding means (that is, screw feeds or the like) as distinguished from direct hand feeding pressure. Thus heavy cuts may be made in the work, because of the use of the positive feeding means, and because the supplementary cutter parts 67, 73, 83, etc., are made of strong and rugged construction, well able to withstand heavy cutting operations.

During the movements of the table 113, the table 121 carrying the model is moved in exactly the same way, so that the operator can watch the relative positions of the tracing stylus 47 and the model, and thus will know when to stop the movement in any given direction. If desired, the pattern may be placed directly on the table 113b, instead of using the supplementary table 121, and the two tables 113 and 113b may be driven at equal speeds through the gearing of Figs. 3 and 4.

When the very heavy rough cutting operation is finished, the supplementary cutter holder 73 and its bracket 67 are removed from the machine, and the resulting opening in the front of the frame 65, where the bracket was removed, is closed by a suitable cover plate. Then the stylus holder 45 is moved rightwardly along the beam 25 so that there is the same distance between the stylus 47 and the cutting tool mounted in the chuck 51 of the holder 49, as the distance formerly existing between the tracing stylus 47 and the cutter 83. The distance between the tracing stylus and the cutter now to be used being made the same as the distance between the tracing stylus and the supplementary cutter previously used for the heavy rough cutting, it is unnecessary to unclamp the work or the pattern or rearrange them in any way with respect to each other. The beam 25 is moved to proper position to cause the tracing stylus 47 to cooperate with the pattern, and to cause the rotary cutting tool mounted in the chuck 51 to cooperate with the work, and the cutting operation is resumed.

This part of the cutting operation may be termed for convenience the "standard cutting" operation, and may be somewhat in the nature of rough cutting although not particularly heavy rough cutting, the heavy work having been done by the supplementary cutter 83. During the standard rough cutting operation, the tables 113 and 121 may remain stationary and the cutter and tracing stylus may be moved over the work and pattern, by the positive feeding means constituting the slides 91 and 95 and associated parts, and the connection 99. These slides may be driven as above explained by the power of the motor 55, or may be driven by direct manual operation of the hand wheels 93 and 97, but in either event this constitutes positive feeding means, as that term is herein used, and such positive feeding means is very advantageous for what may be termed the standard rough cutting operation. On the other hand, if desired, the standard rough cutting operation may be accomplished by maintaining the beam 25 stationary (by the slides 91 and 95 and the connection 99) and by moving the tables 113 (and the table 121 which moves with it) either by the hand operated or the motor operated positive feeding means provided for this table.

When all of the rough cutting work is finished, and when the final finishing operation is to be performed, direct hand pressure rather than positive feeding means is preferable, in order that the operator may properly execute on the work the fine details present on the pattern. For such finer finishing operation, the tables 113 and 121 remain stationary, and the disengageable connection 99 between the beam 25 and the slide 95 is disconnected, so that the beam is free to be moved by hand. The operator then moves this beam by direct hand pressure applied either directly to the beam or, preferably, to a handle placed at the point 37 of the pantograph linkage 27, in order to obtain the leverage effect of the pantograph linkage. The beam 25, being free to move in any direction but remaining always parallel to itself, is easily moved by hand pressure transmitted directly or through the pantograph linkage, and work of the finest and most detailed character can readily be executed in this manner.

It should be especially noted that the supplementary cutter 83 and holder 73, specially designed for heavy and rugged work, are mounted directly on the frame extension 65 of the machine, and not on the beam 25, the pantograph linkage 27, or associated parts. Hence, by the use of the supplementary cutter of this kind, extremely heavy cuts can be taken when desired, without the necessity of making the beam 25 or the pantograph linkage 27 of unusually heavy construction, because the beam and linkage do not have to withstand the heavy pressures required in the heavy cutting produced by the cutter 83. Hence the parallel motion beam and the pantograph linkage may be made of normal construction, sufficiently light to be readily movable by hand, and well adapted to fine and high grade finishing work, without detracting in any way from the ability of the machine to accomplish also the heaviest rough cutting work, by means of the supplementary cutter 83. The table 113 and its associated supporting and feeding parts are constructed in a sturdy and rugged manner, so as to be able to withstand the heavy pressures required when using the supplementary cutter 83, but this rugged construction of the table does not detract in any way from the ability of the machine to accomplish the very finest and detailed finishing operations, for the table remains stationary during such finishing operations, while only the lighter and more easily movable beam 25 and pantograph linkage 27, and associated parts, are moved.

The machine is, of course, not confined to making all equal scale reproductions. If a reproduction of the pattern on a reduced scale is to be made, the supplementary table 121 is not used but the pattern is clamped directly to the table 113b, the work being clamped as before to the table 113.

The tracing stylus is mounted at the point 37 of the pantograph linkage, and the linkage is adjusted to the desired ratio of reduction between the pattern and the work. The beam 25 is preferably moved to the right and held in fixed position by means of the slides 91 and 95 at the connection 95, while the connection 35 between the beam and the pantograph linkage is moved leftwardly along the top of the beam being adjustable on the beam in the same manner as the corresponding parts in said copending patent application. The stylus at the point 37 of the pantograph linkage is thus brought into proper cooperative relation with the pattern on the table 113b, but is held stationary by reason of the connections 91, 95, 99 which hold the beam 25 stationary.

The heavy rough cutting operation is now performed by moving the tables 113 and 113b in proper ratio to each other, through the power feeding means described in connection with Figs. 3 and 4. The adjustable driving means 229—239 is adjusted to give the same ratio of feeding speed of the table 113b to the feeding speed 113, as the ratio of scale or size of the pattern to the work.

Thus the heavy rough cutting of the work may be done quickly and economically by means of the supplementary cutter 83 able to withstand heavy cutting pressures as above explained. When this heavy cutting has been completed, the cutter 83, holder 73 and bracket 67 are removed from the machine, and the beam 25 is moved leftwardly so as to bring the cutting tool in the chuck 51 into proper cooperative relation to the work on the table 113. The connection 35 between the beam and the pantograph linkage is moved rightwardly along the top of the beam so that the tracing stylus mounted on the pantograph linkage will be at the same distance from the cutting tool now to be used in the chuck 51 as the distance from the stylus to the cutting tool 83 during the heavy cutting operation. The standard rough cutting operation (as distinguished from the extra heavy rough cutting) is now performed, preferably by using the positive feeding means comprising the slides 91 and 95 and associated parts, operating to move the cutter holder 49 through the connection 99. This positive feeding means may be driven either by hand, through the cranks 93 and 97, or by the power drive described in connection with Figs. 8 and 9 of the drawings. As the cutting tool mounted on the holder 49 is moved over the work, the tracing stylus mounted on the pantograph linkage will move correspondingly over the pattern, but on an enlarged scale or ratio, due to the effect of the pantograph.

When the standard rough cutting is completed, and it is time for the final finishing operation, the connection 99 between the slide 95 and the holder 49 is disconnected, so that the beam 25 and the pantograph linkage 27 are now freely moved by hand in any direction. The final finishing operation is then performed, the operator moving the stylus over the pattern by direct hand pressure, and this in turn causes corresponding movement of the cutting tool over the work. Because of the direct hand movement, extremely fine and detailed work of the highest grade can be turned out.

When the work is to be made from the pattern on an enlarged scale rather than a reduced scale, the heavy rough cutting operation is performed as before by moving the tables 113 and 113b at proper ratio with respect to each other through the gearing disclosed in Figs. 3 and 4, while maintaining the cutting tool holder 73 in stationary position, and the tracing stylus also stationary. The tracing stylus may here be mounted in the holder 45. Then when the heavy rough cutting is finished and standard rough cutting is to be performed, the cutting tool may be connected at the point 37 of the pantograph linkage and the tracing stylus may be placed in the holder 45 or in the holder 49. The beam is moved as before, by the positive feeding means 91, 95, whether driven by hand or by the motor 55, and the movements of the beam cause movement of the tracing stylus over the pattern and corresponding movement on an enlarged scale of the cutting tool over the work. As before, when it is time for the final finishing operation the connection 99 between the slide 95 and the holder 49 is disconnected, and the movements of the tracing stylus and the cutting tool are performed by direct hand pressure during the final finishing operation.

From the foregoing explanation it is seen that the machine above described is extremely flexible or versatile in use, being adapted to extremely heavy cutting operations as well as to the finest and highest grade detailed finishing work, and the features of ruggedness and stability which enable extra heavy cutting operations are so designed that they do not interfere in any way with the finest detailed work and do not lessen the ease of movement and operation of the parts when used for detailed work. The various features of adjustment of the machine and the possibility of moving certain parts relatively to other parts are also of great advantage for many kinds of work, as in many instances they avoid the necessity of unclamping and reclamping the pattern or the work when a change is to be made in the mode of operation, or when adjustment of the parts to a different position is needed.

A modified form of machine, also within the scope of the present invention, and having a number of features in common with the machine above described will now be disclosed in connection with Figs. 11 and 12 of the drawings. In this modified machine, no pantograph linkage is employed. The machine frame includes an upright standard 351 carrying a cross bar 353, the front face of which is approximately vertical and provided with horizontally extending guideways and clamping grooves 355. A cutting tool holder 357 and a tracing stylus holder 359 are mounted on these guideways 355 and may be shifted to and clamped in any desired position along the guideways. The cutting tool holder 357 has a spindle carrying a cutting tool 361 at its lower end, the spindle being driven from the motor 363 by belts passing through the belt housings 365 and 367 mounted for oscillation with respect to each other and to the motor 363, so that the belt drive remains effective in any position to which the holder 357 may be moved along the bar 353.

The tracing stylus holder 359 is arranged to receive and hold a tracing stylus 369. The work and pattern tables of this machine may be the same as those disclosed in connection with the embodiment previously described, and illustrated in Figs. 1 to 7. Therefore, the parts of the work and pattern tables are here designated by the same reference numerals used for the corresponding parts in Figs. 1 to 7. As before, the positive feeding means for the tables may be operated directly by hand, through the various hand wheels and cranks, or may be driven from the motor 151 through the gearing shown in Figs. 3 and 4. The supplementary table 121 may be connected to the table 113 in any of the different ways above mentioned in connection with the machine previously described.

In using the machine illustrated in Figs. 11 and 12 the operations are performed in much the same way as above described, except that the cutting tool and the tracing stylus are not bodily moved during operation, and relative movement between the tool and the work and between the stylus and the pattern takes place always by moving the work and pattern tables. When equal scale reproductions are to be made, the supplementary table 121 is preferably used, coupled to the table 113 so that the horizontal movements of one table are always exactly the same as those of the other, thus resulting in an absolutely accurate reproduction on an equal scale. The use of two separate tables adjustable relatively to each other has, however, an important advantage over the use of one large table on which both the pattern and the work might be mounted, for the reason already pointed out that after setting and clamping the work and pattern on their respective tables, the position of the tables can be somewhat adjusted relatively to each other to bring corresponding points of the work and pattern at exactly the right distance from each other. This is much more satisfactory than attempting to unclamp the work or the pattern and move it on its table, or unclamping the cutting tool holder or the stylus holder and moving it along its supporting bar 353.

The use of two separate tables coupled to each other instead of placing the work and pattern on the same table, has the further important advantage that frequently the height of the work differs greatly from the height of the pattern. When this is the case, the supplementary table 121 (in both forms of machine above described) can be placed at an elevation higher or lower than that of the table 113, to compensate for the difference in thickness or height of the work and the pattern, without the necessity of making the tool spindle or the tracing stylus vertically adjustable. Thus the machine can be kept relatively simple and inexpensive, eliminating unnecessary features of adjustment while at the same time it is well adapted for operating upon patterns and work pieces of materially different thicknesses or heights. Moreover, even if the elevations of the tool spindle and of the tracing stylus are made adjustable relatively to each other, this would serve only for relatively small differences in height of the work and the pattern, for the lateral pressures encountered in doing heavy work make it advisable to have the tracing stylus and the cutting tool at elevations which do not differ greatly from each other.

When the work is to be reproduced from the pattern on an enlarged or reduced scale rather than an equal scale, then the supplementary table 121 is not used, but the two tables 113 and 113b are driven in proper ratio to each other through the gearing shown in Figs. 3 and 4, the relative feeding speeds of the two tables determining the scale on which the work is reproduced with respect to the pattern.

As before, the supplementary table 121 may be supported on bars or other anti-friction devices (Fig. 7) when especially heavy masses are to be moved, and the supplementary table may be connected to the table 113 by means of a connection which will allow relative vertical movement but will transmit all horizontal movement as in Fig. 6.

If several pieces of work are to be reproduced on the same scale from the same pattern, more than one cutter holder 357 may be mounted on the bar 353 and the several work pieces may be placed on the table 121, or on still other supplementary tables similarly coupled to the table 121 to be moved by the movements of the table 113. Of course, the various positions of the pattern and the work may be reversed, and the tool holder 357 and stylus holder 359 may be interchanged with each other.

When the accompanying claims refer broadly to coupling means between the work table and the pattern table this is to be understood as applying either to gearing coupling means, such as illustrated in Figs. 3 and 4, or to direct coupling means such, for example, as the parts 123—129.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A copying machine including means for holding work and a pattern, a tracing stylus for cooperation with the pattern, a frame, a cutter spindle for holding a cutting tool for normal cutting operations on the work, said cutter spindle being supported from said frame for movement relatively thereto in a plurality of intersecting directions, and a special cutter spindle for holding a cutting tool for heavy cutting operations on the work, said special cutter spindle also being supported from said frame and being held with its axis in stationary position relatively thereto during the progress of any given cutting operation.

2. A copying machine including means for holding work and a pattern, a tracing stylus for cooperation with the pattern, a frame, a cutter spindle for holding a cutting tool for normal cutting operations on the work, said cutter spindle being supported from said frame for movement relatively thereto in a plurality of intersecting directions, a special cutter spindle for holding a cutting tool for heavy cutting operations on the work, said special cutter spindle also being supported from said frame and being held with its axis in stationary position relatively thereto during the progress of any given cutting operation, a single driving motor, and means for driving both of said spindles from the same motor.

3. A copying machine including means for holding work and a pattern, a tracing stylus for cooperation with the pattern, a frame, a cutter spindle for holding a cutting tool for normal cutting operations on the work, said cutter spindle being supported from said frame for movement relatively thereto in a plurality of intersecting directions, a special cutter spindle for holding a cutting tool for heavy cutting operations on the work, said special cutter spindle also being supported from said frame and being held with its axis in stationary position relatively thereto during the progress of any given cutting operation, a driving motor, belt means for driving said normal spindle from said motor, and shaft and gearing means for driving said special spindle from said motor.

4. A copying machine including a frame, means for holding work, a cutter spindle for holding a cutting tool to perform normal cutting operations on said work, means mounting said cutter spindle for bodily movement relatively to said frame in a plurality of intersecting directions during cutting operations, a special cutter spindle for holding a cutting tool for heavy cutting operations on said work, means mounting said special cutter spindle in a position bodily fixed with respect to said frame during cutting operations performed thereby, and means for moving said work holding means relative to said frame to cause relative movement between said work and said cutting tool on said special spindle, during heavy cutting operations.

5. A copying machine as described in claim 4, further including a source of power, and means for driving either of said spindles at will from the same source of power.

6. A copying machine as described in claim 4, further including a source of power, means for driving said first mentioned spindle from said source of power, and positive gear and shaft means for driving said heavy cutting spindle from the same source of power.

7. A copying machine including a frame, means for supporting work, a cutter spindle mounted for bodily movement relatively to said frame in a plurality of intersecting directions so that a cutting tool carried by said spindle may move over the work, positive feeding means for moving said spindle bodily relatively to said frame in a plurality of intersecting directions, a source of power, means for driving said spindle from said source of power, and means for driving said feeding means from the same source of power, said last mentioned driving means including changeable gearing for driving said feeding means at a plurality of different speeds for a given speed of driving said spindle.

8. A copying machine including a frame, means for holding work, a cutter spindle for holding a cutting tool to perform normal cutting operations on said work, means mounting said cutter spindle for bodily movement relatively to said frame during cutting operations, a special cutter spindle for holding a cutting tool for heavy cutting operations on said work, means mounting said special cutter spindle in a position bodily fixed with respect to said frame during cutting operations performed thereby, positive feeding means for moving said first mentioned spindle bodily relatively to said frame, a source of power, means for driving said first mentioned spindle from said source of power, means for driving said special heavy cutting spindle from the same source of power, and means for driving said spindle feeding means from the same source of power.

9. A copying machine including a tracing stylus, a cutting tool, table means for holding a pattern in position to cooperate with said tracing stylus, table means for holding work in position to cooperate with said cutting tool, said pattern table means and work table means being originally movable independently of each other, means for adjusting the position of said pattern table means in three mutually perpendicular directions relatively to said work table means, and means coupling said pattern table means to said work table means to move one concomitantly with movement of the other.

10. A copying machine including means for holding a tracing stylus, a cutter spindle for normal cutting operations, a special cutter spindle for heavy cutting operations, a pattern table for holding a pattern in position to cooperate with said tracing stylus, a work table for holding work in position to be operated upon by cutting tools associated with said spindles, said pattern table and said work table both being mounted for movement independently of each other, and means coupling said tables to each other to cause conjoint movement thereof.

11. A copying machine as described in claim 10, further including means for moving one of said tables relatively to the other to adjust the position of one relatively to the other, said coupling means being effective to couple the two tables to each other in any position to which they may be adjusted relatively to each other.

12. A copying machine including a frame, a tracing stylus and a cutter spindle supported from said frame, a pattern table movable relatively to said frame for holding a pattern in position to cooperate with said tracing stylus, a work table movable relatively to said frame independently of said pattern table for supporting work in position to cooperate with a cutting tool associated with said cutter spindle, and power means for moving both of said tables relatively to said frame.

13. A copying machine including a frame, a tracing stylus and a cutter spindle supported from said frame, a pattern table movable relatively to said frame for holding a pattern in position to cooperate with said tracing stylus, a work table movable relatively to said frame independently of said pattern table for supporting work in position to cooperate with a cutting tool associated with said cutter spindle, and power means for moving one of said tables relatively to said frame at one speed and for moving the other of said tables relatively to said frame at a different speed.

14. A copying machine as described in claim 13, in which said power means may move each of said tables in an approximately vertical direction and in each of two approximately horizontal directions at approximately a right angle to each other.

15. A copying machine of the type including a tracing stylus, a cutter spindle, a pattern table for supporting a pattern in position to cooperate with said tracing stylus, a work table for supporting work in position to cooperate with a cutting tool associated with said spindle, said pattern table and said work table being originally movable independently of each other, characterized by means for adjusting the position of one of said tables in substantially vertical direction relatively to the other of said tables, and means directly connecting said two tables to each other so that movement of one table causes corresponding movement of the other table.

16. A copying machine as described in claim 15, in which said connecting means includes a connection rigid with respect to movements in an approximately horizontal direction and slidable with respect to movements in an approximately vertical direction.

17. A copying machine as described in claim 15 in which said connecting means includes a bracket secured to one of said tables, a second bracket secured to the other of said tables, and means rigidly connecting said two brackets to each other in any one of a plurality of positions to which they may be adjusted with respect to each other.

18. A copying machine including a frame, a tracing stylus and a cutter spindle, both supported from said frame, a first table and a second table each independently movable relatively to said frame, a supplementary table mounted on and supported by one of said tables and movable relatively thereto, one of said tables being adapted to support a pattern and another of said tables being adapted to support work, and means connecting said supplementary table to the other of said tables to move said supplementary table by movement of the other of said tables.

19. A copying machine as described in claim 18, further including rolling anti-friction means interposed between said supplementary table and that one of the other tables on which it is supported.

20. A copying machine including a frame, means for holding work, a cutter spindle for holding a cutting tool to perform normal cutting operations on said work, means mounting said cutter spindle for bodily movement relatively to said frame during cutting operations, a special cutter spindle for holding a cutting tool for heavy cutting operations on said work, means mounting said special cutter spindle in a position bodily fixed with respect to said frame during cutting operations performed thereby, positive feeding means for moving said first mentioned spindle bodily relatively to said frame, a source of power, means for driving said special heavy cutting spindle from said source of power, and means for driving said spindle feeding means from the same source of power.

21. A copying machine including a frame, a tracing stylus and a cutter spindle, both supported from said frame, a first table movable relatively to said frame, a second table, a supplementary table mounted on and supported by said second table and movable relatively thereto, said first table and said supplementary table being adapted to support work and a pattern, and means connecting said supplementary table to said first table to move said supplementary table by movement of said first table.

KURT ZWICK.